Aug. 30, 1966   M. A. HOWE, JR   3,269,080
SEALING METHOD AND APPARATUS THEREFOR
Filed March 21, 1963

United States Patent Office 3,269,080
Patented August 30, 1966

3,269,080
SEALING METHOD AND APPARATUS THEREFOR
Milton A. Howe, Jr., Bedford, Mass., assignor to W. R. Grace & Co., Duncan, S.C., a corporation of Connecticut
Filed Mar. 21, 1963, Ser. No. 266,913
9 Claims. (Cl. 53—30)

This invention relates to improved methods and apparatus for sealing the open end of thermoplastic bags or pouches and particularly to improved methods and apparatus for sealing the open end of vacuumized bags or pouches of heat shrinkable thermoplastic films.

The use of bags or pouches of heat shrinkable thermoplastic films to vacuum package a wide variety of products is well-known to the art. Such packaging methods are particularly useful in packaging food items such as poultry, hams and the like. In conventional practice a turkey (for example) is placed in a bag or pouch of heat shrinkable thermoplastic film, a vacuum is drawn through the open end of the bag, and the open end is then fully closed to ambient atmosphere by twisting or crimping a band or clip about the neck of the bag to seal the turkey in the vacuumized bag. As a final step the entire package is subjected to a brief heating period to shrink the bag into a tight "second skin" around the enclosed product.

The use of clips, bands, adhesives etc., to aid in effecting closure of the bag obviously entails and undesirable additional cost to the packaging process since such use requires additional labor, raw materials and equipment. Twisted closures without a clip, etc. are often unsatisfactory because the twist once released tends to unwind and become further untwisted when the package is heat shrunk.

Attempts to use known heat seal methods for forming closures on vacuumized bags made of heat shrinkable thermoplastic films have been made. The art-known heat seal methods are, however, generally unsatisfactory because the heat required for sealiing also shrinks film in and around the seal area, causing the seal to pull apart. The shrinkage also creates mechanical strains in film drawn about the product, sometimes causing the bag to tear and frequently creating thin areas which rupture during the subsequent heat shrinking or later storage and handling.

It is a general object of this invention to provide methods and apparatus for effectively closing bags of heat shrinkable thermoplastic films while at the same time avoiding the above-noted prior art problems. One specific object of the invention is to provide an improved method for thermally sealing the open end of a vacuumized bag of heat shrinkable thermoplastic film. Still another object is to provide apparatus for carrying out the improved method. Further objects and advantages of the invention will become apparent to those skilled in the art in view of the following more detailed description, together with the accompanying drawings, in which:

In the method of the present invention the gathered end of a vacuumized bag of heat shrinkable thermoplastic film is clamped at a point between the enclosed product and the vacuum nozzle, the gathered portion opposite the product side of the clamp is pressed into a compact mass, and the compact mass is heated to a temperature at which the thermoplastic film is at least partially fused. During the heating period little or no pressure is applied to the heated area. The pressure, if any, during the heating step is not greater than that which permits the gathered, heated area to shrink and thicken into expanded cross-section. Then the heated, thickened area is compressed to a smaller thickness and simultaneously cooled. Pressure during this step is sufficient to reduce the thickness of the hot, fused or partially fused film at least about 10% and such pressure is maintained until the heated area has cooled at least to a temperautre at which the film is resolidified. Preferably thickness reduction is from about 20% to 30%. Then the clamping restraint between the product and the thus sealed portion can be released. Excess film beyond the seal can be trimmed away and discarded if desired. This trimming step can be performed between the clamping and heating steps, if desired, or can be omitted altogether if final package appearance is not critical. Gathering of the open bag end may include a twisting step, if desired. Twisting offers no advantages in the method of this invention and thus for economical and other reasons is preferably omitted.

The method of this invention differs from known heat sealing methods in that practically no restraint is used during the heating step and all effective sealing pressure is applied after heating is completed.

Figure 5:
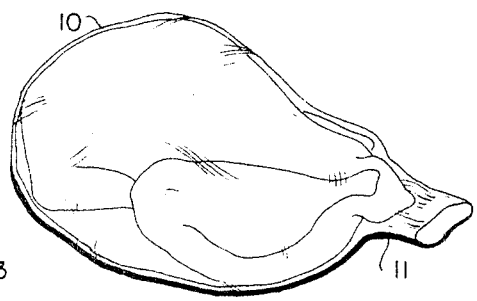
FIGURE 5 is a perspective view of a vacuumized, thermally sealed package made in accordance with the invention.

The final package, after trimming and heat shrinking of the bag portion tightly about the enclosed product, presents a very pleasing appearance. The package has a bag portion 10 closely conforming to product therein, and a thermally sealed finlike end closure 11 made by the above-described method (see FIGURE 5). The seal is completely hermetic and by actual test and observation has been found to be fully air-tight for longer periods of time than closures sealed by previously known methods.

The apparatus shown in FIGURES 1 through 4 is particularly designed for performing the method of this invention in the packaging of poultry, especially turkeys and other large fowl.

The apparatus includes a suitable rectangular frame made from fabricated or cast structural members properly secured together in known manner. The frame includes a pair of upper horizontal members 20, a pair of lower horizontal members 21, and a pair of vertical members 22 and 23 at the respective ends of the horizontal members. Also included are suitable horizontal and/or vertical and/or diagonal cross-members to give substantial rigidity to the frame structure. Only several such cross members, i.e., horizontal cross-members 24 and 25 (FIG. 2) are shown. For mobility the frame is usually but not necessarily supported on casters 26 or other like means.

Secured to and extending upwardly from the rear horizontal frame member 20 are frame extensions 27 and 28 including horizontal members 29 and 30, respectively, pairs of vertical members 31 and 32, respectively, and a suitable number of cross members 33, only one of which is shown. In the embodiment shown an optional pair of counter-rotating swage rollers 34, 35 is suitably mounted between the two upper frame extensions. As shown the apparatus also includes a control panel 36, of known construction and function, mounted on frame extension 27.

A pair of bearing blocks 37—37 and 38—38, respectively, are mounted adjacent the ends of upper horizontal members 20. Horizontal, rotatable shafts 39 and 40, respectively, are journalled in these bearing blocks. Secured to each end of each shaft are chain sprockets 41 and 42 over which ride two parallel endless chains 43. Shaft 40 is driven by suitable means, e.g., chain drive 44 whereby the chains 43 are in turn continuously driven by sprockets 42 and ride over the sprockets 41 on the freely rotatable shaft 39.

An endless rigid horizontal conveyor 48 is formed in the embodiment shown by securing a plurality of closely spaced slats 49 to an between chains 43. On the side of the chains opposite the slats are a plurality of rollers 100 which ride on rails (not shown) over at least the upper run of the conveyor to keep the conveyor substantially flat.

Figure 4:
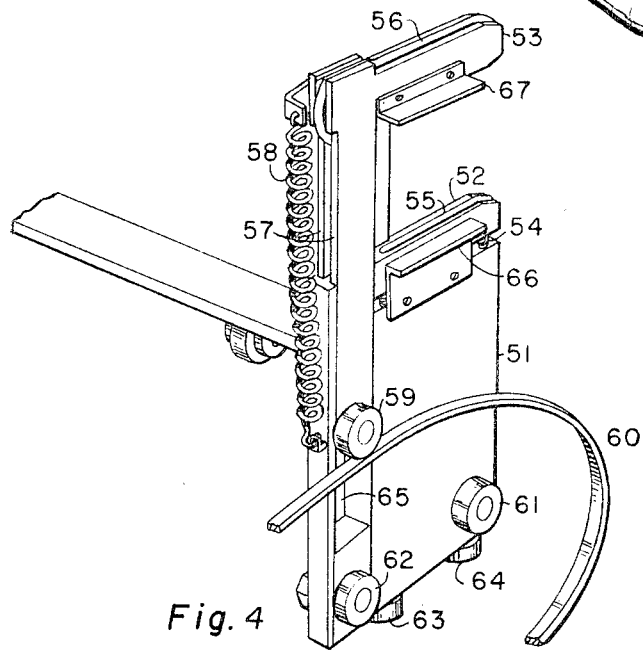
FIGURE 4 is a magnified perspective view of a clamp suitable for use in the machine.

A plurality of clamping means 50 are secured at spaced intervals to the inside edge of the endless conveyor. The construction of the specific clamping means used in the illustrated apparatus is best seen in FIGURE 4. There it is seen that the clamping means includes a main portion or base 51, an anvil or lower jaw 52, and an upper jaw 53. The lower jaw is attached to the clamp body at the forward and rear ends by a screw or other like means 54. Between the screw attachments the lower jaw rests upon a row of compression springs (not shown), the ends of which are maintained in corresponding recesses (not shown) bored into the bottom of the jaw and the top of the clamp body. The upper surface of the lower jaw has a longitudinal semicircular groove 55 extending over its full length.

The upper jaw is grooved around its entire major circumference and an O-ring 56 of rubber or other like resilient material is placed therein. This O-ring is pressed into the groove in the lower jaw when the clamp is closed. On each side and at the rear end of the upper jaw are arms 57 that slide in corresponding slots in the rear end of the clamp body. A tension spring 58 is attached at its ends to spring brackets at the very rear of clamp body 51 and upper jaw 53, whereby the upper jaw is normally biased into closed position with the lower jaw. A cam follower 59 at the lower extremities of arms 57 and secured by means extending fully through the annular space 65 at the middle rear portion of the clamp body permits opening of the jaws as the follower rides over an upwardly inclined cam surface shown schematically at 60. Cam followers 61, 62, 63 and 64, which ride in or on cam surfaces provided over most of the upper run of the endless conveyor, keep the clamp assemblies in a substantially vertical upright position as they pass through this portion of the machine. The clamp means further include L-shaped plates 66 and 67 one attached directly to the upper jaw and one to the clamp body so that one leg thereof extends outwardly on about the same horizontal plane as the top surface and bottom surface of the lower and upper jaw, respectively. These plates are suitably constructed of stainless steel sheet metal. The function of these shields will be made apparent hereinafter.

Returning to FIGURES 1 and 2 it is seen that the apparatus also includes gapped heating bars 79 and 80 and gapped cooling bars 81 and 82. The heating bars are connected to any suitable source (not shown) of heating power, e.g., electric power. The cooling bars are generally constructed in known manner to permit the flow of a refrigerating fluid, e.g., cold water, liquified halogenated hydrocarbons, etc., therethrough. The gap between the cooling bars gradually decreases from the entrance end (left end in FIGURE 1) to the exit end. If it is desired to eliminate swaging rolls 34 and 35, their function may be replaced by providing an inclined bevel entrance end on the cooling bars. The heating bars may be separated into separate sections, as shown, or may comprise one continuous elongated unit. Division into separate sections permits somewhat improved temperature control.

The apparatus further includes guide rails 68 and 69 upon which there is mounted a vacuumizing assembly generally designated as 70. The assembly includes a suitable mounting plate 71, support plate 72, air cylinder 73. The assembly is secured to guide plate 74 which is reciprocable on the guide rails 68 and 69. The cylinder 73 is connected to a suitable source of air pressure (not shown) in the usual manner, e.g. through conduits 75 and 76. A three part telescoping vacuum nozzle is secured on the piston end of the air cylinder. The nozzle construction is best seen in FIGURE 3.

Figure 1:
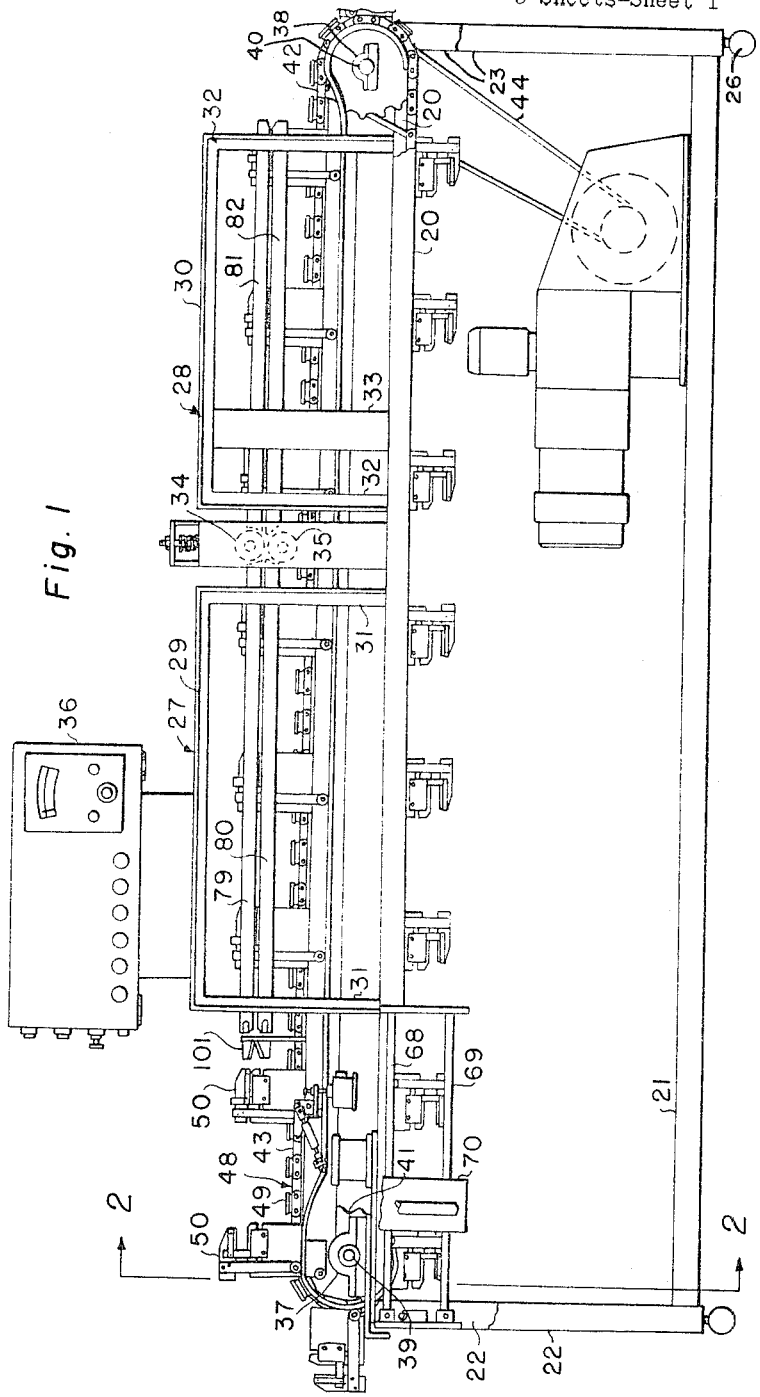
FIGURE 1 is a view in elevation of the rear side of the machine (i.e., the side opposite that at which the operator is positioned) with certain parts broken away for better clarity.
Figure 2:
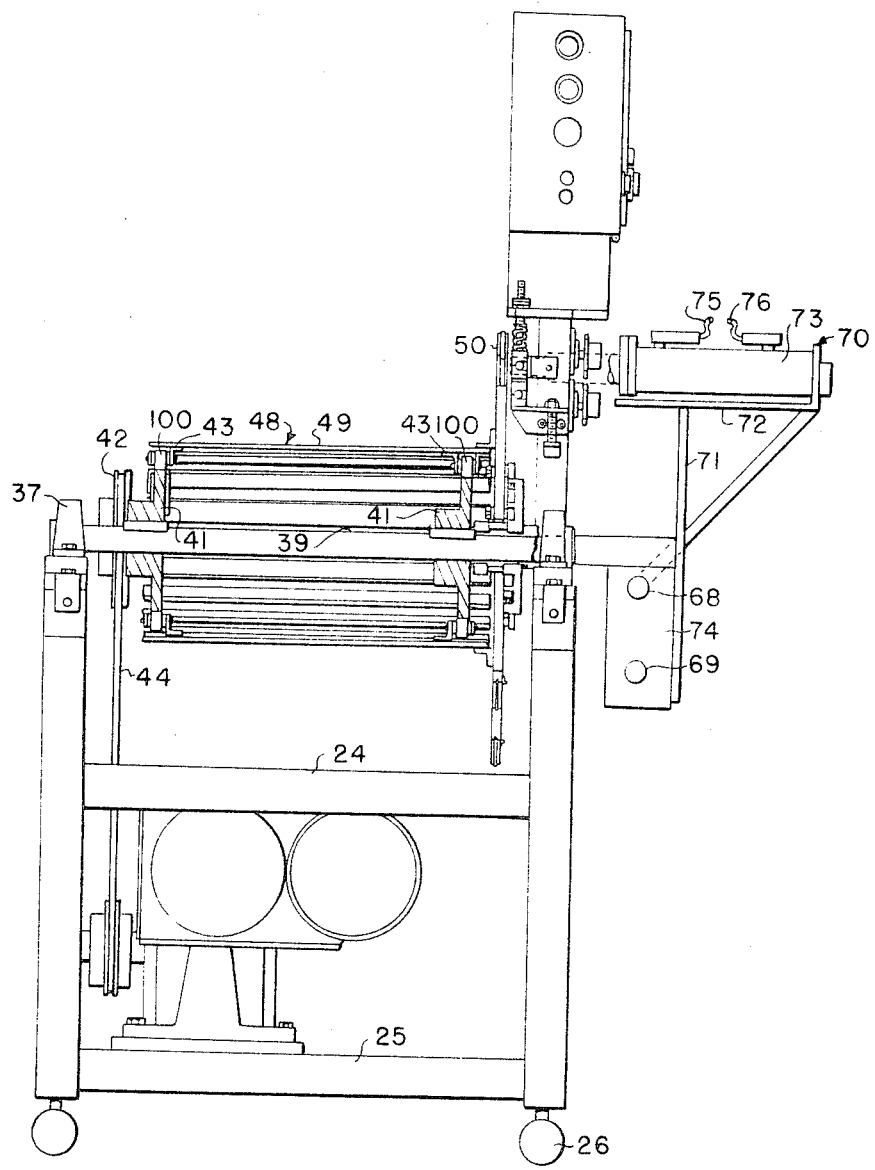
FIGURE 2 is an end view in elevation taken on the line 2—2 of FIGURE 1.
Figure 3:
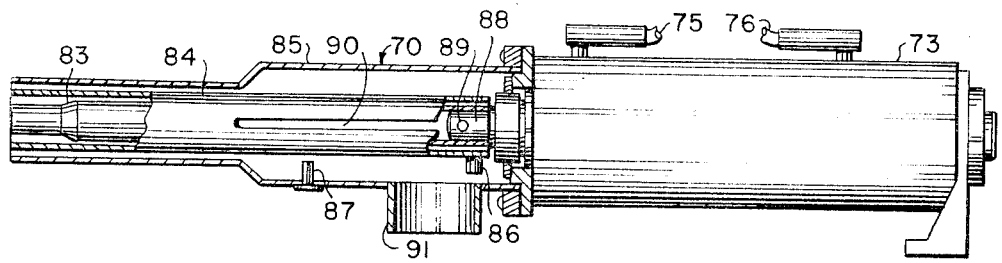
FIGURE 3 is a magnified view, partially in cross-section, of a retractible vacuum nozzle used on the machine.

FIGURE 3 illustrates the vacuumizing nozzle in fully telescoped position. It is seen that the nozzle comprises three separate pipes 83, 84 and 85. The outer pipe 85 is stationary. Middle pipe 84 slides on the inner pipe between the fully retracted position and the position where stop pin 86 and limit pin 87 abut. Inner pipe 83 is connected by dowel pin 89 or other suitable means to the end of piston rod 88 which is operated by air cylinder 73. The dowel pin also projects through slots 90 on either side of the middle pipe. When the piston rod is actuated, the inner pipe is pushed outwardly until dowel pin 89 meets the outer end of slots 90, then the inner and middle pipe move outwardly together until abutment of pins 86 and 87. Telescoping is accomplished by retraction of the piston rod. Vacuum is drawn through all three pipes through a common port 91 which is connected to a suitable source of vacuum (not shown).

In operation the vacuumizing assembly is slid to the far left end (FIGURE 1) of guide rods or rails 68, 69. The open end of a bag or pouch containing a turkey, for example, is slipped over and clamped tightly about the outer end of pipe 85. The nozzle assembly at this point is in fully extended position. Pipe 83 fits into and evacuates the inner cavity of the turkey and outer pipes 84, 85 evacuate the space around the turkey and in the rest of the bag.

An open clamping means, beginning its path along the upper run of the conveyor upon which the turkey bag is now resting, abuts with and begins to push the vacuumizing assembly along the guide rails. The inner and middle pipes are progressively retracted as this movement progresses. Camming action on the upper jaw cam follower is then discontinued whereby the clamp closes tightly about the gathered portion of the bag between the contained product and the vacuum pipe 85 into which the other pipes have been retracted. Clamping between the product and the area to be sealed prevents formation of holes due to differential pressures on the weak, heated film in the seal area, and prevents transfer of mechanical strains from the film around the product to the weak hot film in the seal area.

The gathered film is held between the plates 66 and 67 of the clamp assembly. As the conveyor and closed clamp travel together along the upper run of the conveyor these plates, with gathered film held between them, pass into and through the gap between the heating bars. The plates have several functions. Their primary functions are to quickly transfer heat into and out of the seal area during the heating and cooling steps, to retain the gathered area to be sealed in a restricted position, and to keep hot film out of direct contact with the heating bars to which it would ordinarily adhere. A secondary, but nevertheless desirable and quite useful, function is to emboss suitable identification signals, e.g. trade names, trademarks, Government inspection numbers, etc.; on the sealed area.

During passage through the heating bars, the gathered film held between the clamp plates is heated by conduction to temperatures at which it is partially fused. Only sufficient pressure to obtain good heat transfer to the seal area is maintained. This slight pressure permits shrinkage of film and consequent cross-sectional expansion in the seal area during and immediately after the heating step.

The hot seal area is then compressed by swaging rollers (as illustrated) or (preferably) by inclined bevel edges on the entrance end to the cooling bars. The gap between the cooling bars is gradually decreased toward the exit end of the apparatus to progressively compress the seal area to a thickness at least about 10% less than the thickness of the seal area as it leaves the heating step. The seal area is at the same time cooled to temperature sufficient to resolidify the film material therein, generally to temperatures of about 100° Fahrenheit or less.

After leaving the cooling bars the upper clamp jaw is again cammed open and the finished bag is transferred to another conveyor for final heat treatment. As noted previously, waste film extending beyond the seal can be trimmed away either just before the heating step or after cooling is completed and before removal from the clamping means. It is usually preferred to trim between the clamping and heating steps (noted e.g., trimming knives 101, FIGURE 1) so as to avoid the necessity of sliding film off of the vacuum assembly at this point.

The foregoing description is by necessity quite detailed. Many modifications will be apparent to those skilled in the art. It is therefore intended that the description be considered as illustrative and not limiting the invention other than as defined in the appended claims.

What is claimed is:

1. Method for sealing the open end of bags made from heat shrinkable thermoplastic films comprising gathering the open end into a compact mass, transversely clamping at least a portion of the compact mass between the enclosed product and the bag end, heating the compacted mass while pressure thereon is not greater than that which permits the heat mass to shrink and expand to thickened cross-section, discontinuing said heating, and applying increased pressure to said mass while cooling the heated mass to temperatures below that at which the film is resolidified, said increased pressure on the heated mass being sufficient to reduce the thickness thereof at least about 10 percent.

2. Method as defined in claim 1 wherein said heating is sufficient to at least partially fuse the heated compact mass.

3. Method as defined in claim 1 wherein said open end is gathered into a compact untwisted mass.

4. Method as defined in claim 1 wherein the pressure during cooling results in a thickness reduction of from about 20 to about 30 percent.

5. Method as defined in claim 1 wherein said bag is vacuumized prior to clamping the gathered end, and said clamping is maintained at least until the completion of the cooling step.

6. Method as defined in claim 4 wherein said cooling is continued until the seal area is at a temperature below about 100° Fahrenheit.

7. Packaging apparatus comprising an endless rigid conveyor, means for driving said conveyor, a plurality of clamping means secured to and spaced along one side of said conveyor, said clamping means having plates extending outwardly from and on about the same plane as the surfaces of the clamping jaws, a pair of elongated gapped heating bars through which said plates travel, a pair of elongated gapped cooling bars on the path of travel beyond said heating bars through which the said plates also pass, the gap between said cooling bars gradually decreasing toward the delivery end of said conveyor, means for opening said clamping means at the respective ends of the upper run of said conveyor, and means for maintaining said clamping means closed over at least that portion of the said upper run which includes the heating and cooling bars.

8. Apparatus as defined in claim 7 further comprising package evacuating means for evacuating the package interior before it is clamped and fed through the heating bars.

9. Apparatus as defined in claim 8 wherein said evacuating means comprise a telescopable vacuum nozzle, portions of which extend through the opening clamping means and which retract just prior to the time the clamps close for travel through the heating and cooling bars.

References Cited by the Examiner

UNITED STATES PATENTS

| 2,335,738 | 11/1943 | Casey | 53—112 |
| 2,783,599 | 3/1957 | Weikert | 53—30 |
| 2,898,714 | 8/1959 | Keith | 53—30 |
| 2,924,924 | 2/1960 | Garapolo et al. | 53—112 |
| 3,040,801 | 7/1962 | Harrison | 53—30 XR |
| 3,111,794 | 11/1963 | Spolsino | 53—39 XR |
| 3,149,649 | 11/1964 | Hix | 53—22 XR |

FOREIGN PATENTS 683,257  11/1952  Great Britain.

FRANK E. BAILEY, *Primary Examiner*.

S. ABEND, *Assistant Examiner*.